(12) United States Patent
Chisu et al.

(10) Patent No.: US 10,228,899 B2
(45) Date of Patent: Mar. 12, 2019

(54) MONITORING ENVIRONMENTAL NOISE AND DATA PACKETS TO DISPLAY A TRANSCRIPTION OF CALL AUDIO

(71) Applicant: Motorola Mobility LLC, Chicago, IL (US)

(72) Inventors: Daniel C. Chisu, Franklin Park, IL (US); Si Chen, Chicago, IL (US)

(73) Assignee: Motorola Mobility LLC, Chicago, IL (US)

(*) Notice: Subject to any disclaimer, the term of this patent is extended or adjusted under 35 U.S.C. 154(b) by 45 days.

(21) Appl. No.: 15/629,160

(22) Filed: Jun. 21, 2017

(65) Prior Publication Data

US 2018/0373488 A1 Dec. 27, 2018

(51) Int. Cl.
*G06F 3/16* (2006.01)
*G01H 11/06* (2006.01)
*H04N 21/2343* (2011.01)

(52) U.S. Cl.
CPC .............. *G06F 3/165* (2013.01); *G01H 11/06* (2013.01); *H04N 21/234336* (2013.01)

(58) Field of Classification Search
None
See application file for complete search history.

(56) References Cited

U.S. PATENT DOCUMENTS

| 8,185,388 B2* | 5/2012 | Gao | G10L 19/005 704/228 |
| 2007/0140306 A1* | 6/2007 | Klein | H04L 1/205 370/516 |
| 2013/0156407 A1* | 6/2013 | Seok | H04N 5/76 386/343 |
| 2014/0375545 A1* | 12/2014 | Ackerman | G06F 3/017 345/156 |
| 2016/0030841 A1* | 2/2016 | Perlman | A63F 13/355 463/33 |
| 2016/0246899 A1* | 8/2016 | Hirschtick | G06F 17/50 |
| 2016/0286575 A1* | 9/2016 | Weingertner | H04W 28/14 |
| 2017/0201613 A1* | 7/2017 | Engelke | G10L 15/06 |
| 2017/0264735 A1* | 9/2017 | Terra Rios | G06F 17/289 |
| 2018/0061424 A1* | 3/2018 | Lachapelle | G10L 19/005 |
| 2018/0211668 A1* | 7/2018 | Willett | G10L 15/30 |

* cited by examiner

*Primary Examiner* — Neeraj Sharma
(74) *Attorney, Agent, or Firm* — Wolfe-SBMC (57) ABSTRACT

Various embodiments provide a communication system that monitors environmental noise at a computing device. The communication system additionally monitors call audio received at the computing device. Based on the environmental noise and the received call audio, the communication system determines that a user of the computing device is unlikely to hear the received call audio when played back by the computing device. In response to determining that the user of the computing device is unlikely to hear the received call audio, the communication system visually displays a transcription of at least a portion of the received call audio.

20 Claims, 5 Drawing Sheets

MONITORING ENVIRONMENTAL NOISE AND DATA PACKETS TO DISPLAY A TRANSCRIPTION OF CALL AUDIO

BACKGROUND

Users in loud or noisy environments often experience difficulty in hearing audio during a voice or video call. In these environments, users are forced to ask a speaking party to repeat what was previously said, or to wait until the user is able to move to a quieter environment. In many situations, users are not able to ask a speaking party to wait or repeat what was said, causing the user to miss important information. For example, a user might be teleconferencing into a meeting and unable to request that previous topics of discussion be repeated. Similarly, a user may receive a pre-recorded call from a machine without any way to request that the machine play back previous audio. These situations cause frustration and often lead to the user immediately hanging up on the call. Even when a user is able to request that the speaking party stop and repeat missed portions of a conversation, these requests are often annoying to the speaking party. Thus, a user may choose not to bother a speaking party and miss important information communicated during a call. Thus, it is desirable to communicate call audio in a manner that does not disturb parties to the call, even if a party is in a loud or noisy environment.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The various embodiments described herein provide a communication system that monitors audio quality during a call. The communication system determines when it is unlikely that a user of a computing device implementing the communication system will be able to hear call audio based on environmental noise and/or delays between received data packets including call audio data. When the communication system determines that a user is unlikely to hear call audio, the communication system transcribes received call audio into text and visually displays the transcribed text in real-time during the call. Call audio is transcribed into text and displayed for a user to read during the call. In some embodiments, the transcribed text is converted into synthesized speech and audibly played back so that a user can listen to otherwise inaudible call audio. The transcription of call audio is continued until the communication system determines that a user is likely to hear the call audio, based on environmental noise and/or delays between received data packets including call audio data.

The various embodiments described herein improve upon the state of the art by monitoring call audio and environmental noise, and automatically transcribing call audio upon determining that the call audio would otherwise be inaudible to a user. This relieves users of having to ask a speaking party on a call to repeat previously communicated information or waiting to communicate with the speaking party at a later time. In this manner, the user experience with voice and video calls is improved because the user can communicate in loud and noisy environments that would otherwise prohibit such communications. As such, the possibility of missing information communicated in a call is significantly reduced.

In the following discussion, an operating environment is described in which the inventive embodiments described herein can be employed. Following this, various embodiments for transcribing call audio based on audio quality are described.

Example Environment

Figure 1:
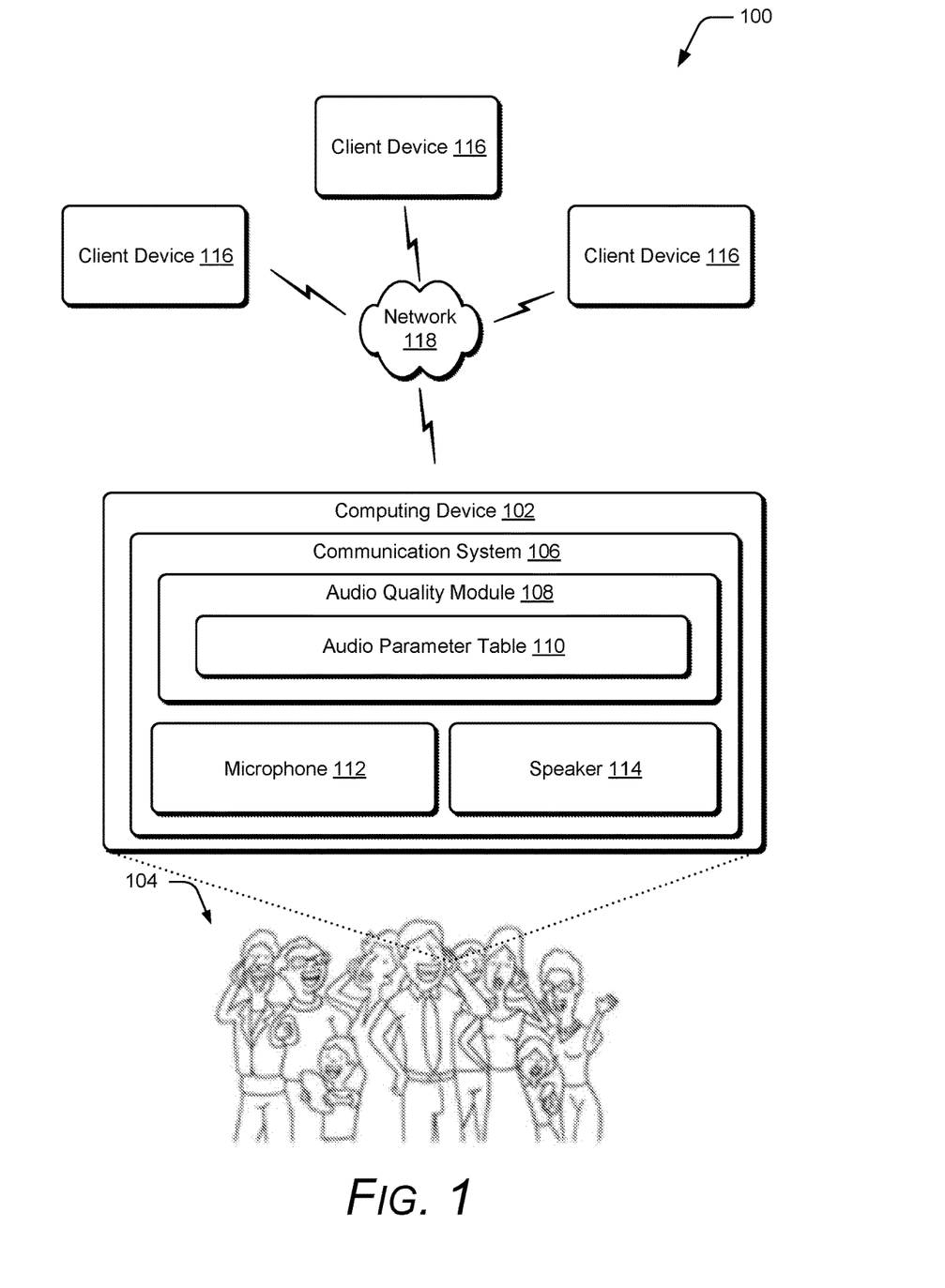
FIG. 1 is an overview of a representative environment that includes an example implementation in accordance with one or more embodiments.

FIG. 1 illustrates an example operation environment 100 in accordance with one or more embodiments. Environment 100 includes computing device 102, which is in the form of a mobile phone, as illustrated in the environment 104. However, computing device 102 can be configured as any other suitable type of computing device without departing from the scope of the claimed subject matter. In the illustrated environment 104, a user of the computing device 102 is using the computing device 102 to conduct an audio call with at least one different user located remotely from the environment 104, such as users of the client devices 116. The illustrated environment 104 represents a loud and noisy environment, where environmental noise occurring from other users' in the illustrated environment 104 may interfere with the user of computing device 102 from being able to hear audio during the call.

Among other things, the computing device 102 includes a communication system 106, which represents functionality that determines when a user of the computing device 102 is unlikely to be able to hear call audio and visually displays a transcription of the call audio so that the user can understand what is being communicated, as further described herein. For discussion purposes, communication system 106 is illustrated as a single system, but communication system 106 can be implemented using any suitable combination of hardware, software, and/or firmware.

Communication system 106 includes audio quality module 108 that is used to monitor environmental noise at the computing device 102, monitor call audio received at the computing device 102, and determine whether a user is likely to hear the call audio received at the computing device based on the monitored environmental noise. As described herein, the audio quality module 108 is configured to determine whether a user of computing device 102 is likely to hear received call audio by comparing environmental noise from the environment 104 against audio parameters stored in audio parameter table 110. Audio parameter table 110 includes information describing various threshold levels for call audio quality. For instance, audio parameter table 110 may specify a threshold level of environmental noise that indicates when a user of computing device 102 is unlikely to hear received call audio. Alternatively or additionally, audio parameter table 110 may specify a threshold level of data packet latency between received data packets that include call audio data. Thus, the audio quality module 108 is configured to monitor received call audio, monitor environmental noise, and compare the monitored information against the audio parameter table 110 to determine whether a user is likely to hear received call audio in a variety of environments.

The communication system additionally includes microphone 112 and speaker 114. Microphone 112 is configured to detect audio received at the computing device 102, such as speech from a user of the computing device 102, environmental noise generated from the environment 104, and so on. The speaker 114 is configured to play back call audio received at the computing device 102 so that a user of the computing device can communicate with different parties to the call. Using the techniques described herein, the communication system 106 is configured to transcribe call audio into displayable text so that a user of the computing device 102 can communicate over a call even in loud and noisy environments. In some embodiments, the communication system 106 uses a dedicated processor for transcribing call audio into displayable text to expedite the transcription. In this manner, the communication system is configured to display transcribed text for received call audio in real-time.

For instance, the audio quality module 108 may monitor environmental noise generated by the environment 104 and received by the microphone 112 of the communication system 106. In the illustrated environment 104, environmental noise may include noise generated by other users in the environment that is audibly detected by the microphone 112. As described herein, environmental noise refers to any noise that is detectable by the microphone 112 other than speech that is communicated by a user of the computing device 102. In implementations, speech communicated by a user of the computing device 102 is intended for communication during a call to one or more different users that are located remotely from the environment 104, such as different users of client devices 116. Speech is detected by the microphone 112 and translated into audio data, which is then communicated to the client devices 116 via the network 118. Although illustrated as communicating with three client devices 116, such as in a four-way conference call, this illustration is not intended to be limiting, and any number of client devices 116 may be involved in a call with computing device 102.

Network 118 may include a local area network (LAN), a wide area network (WAN), a metropolitan area network (MAN), a telephone network, such as the PSTN, a cellular network, a Wi-Fi network, an intranet, the Internet, an optical fiber (or fiber optic)-based network, an enterprise network, a carrier network, a service provider network, or a combination of networks. In one example implementation, network 118 may include an open network. An open network may include a network of applications, devices, and/or systems that follows industry protocols and thereby create an environment of total interoperability. This means that any new protocol-based products (e.g., for the open network) may automatically be compatible with other compliant products, applications, devices, and/or systems, with no additional programming or interfaces needed.

Figure 2:
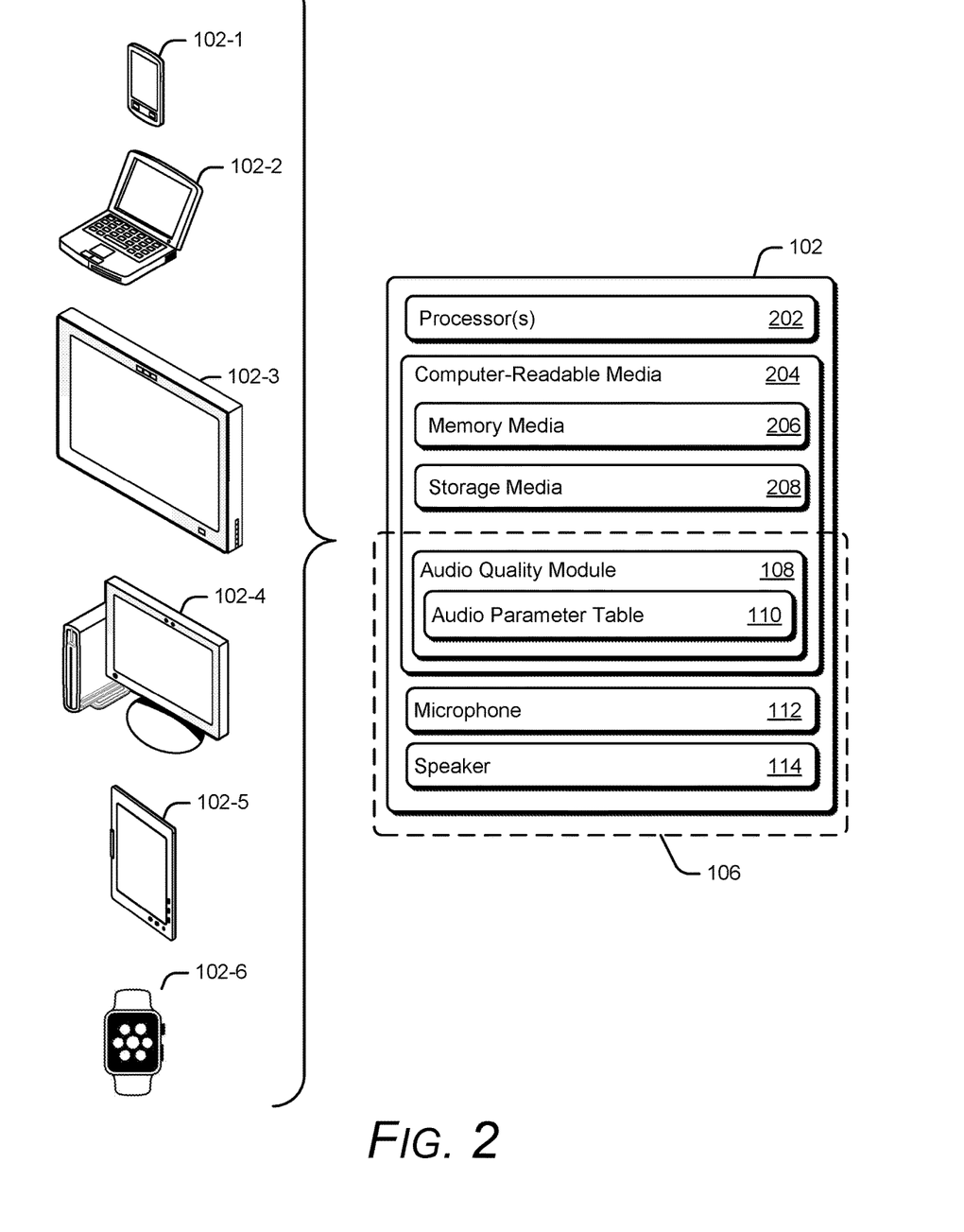
FIG. 2 illustrates a more detailed view of an example implementation included in FIG. 1 in accordance with one or more embodiments.

FIG. 2 illustrates an expanded view of computing device 102 of FIG. 1 with various non-limiting example devices including: smartphone 102-1, laptop 102-2, television 102-3, desktop 102-4, tablet 102-5, and wearable device 102-6. Accordingly, computing device 102 is representative of any suitable device that facilitates audio calls and incorporates audio call quality monitoring capabilities by way of communication system 106. Computing device 102 includes processor(s) 202 and computer-readable media 204, which includes memory media 206 and storage media 208. Applications and/or an operating system (not shown) implemented as computer-readable instructions on computer-readable media 204 can be executed by processor(s) 202 to provide some or all of the functionalities described herein. To facilitate transcribing call audio based on audio quality, computing device 102 includes microphone 112 and speaker 114. Although not shown in FIG. 2, computing device 102 additionally includes a display device for displaying transcribed call audio, as discussed in further detail with respect to FIG. 3.

As illustrated in FIG. 2, portions of communication system 106 are stored on computer-readable media 204: audio quality module 108 and audio parameter table 110. However, although audio quality module 108 and audio parameter table 110 are illustrated here as residing on computer-readable media 204, they each can alternately or additionally be implemented using hardware, firmware, or any combination thereof. Communication system 106 also includes microphone 112, which can be one or multiple microphones or other suitable apparatuses to capture sound at the computing device 102. Communication system 106 further includes speaker 114, which can be one or multiple speakers to play back call audio received at the computing device 102.

Having described an example operating environment in which various embodiments can be utilized, consider now a discussion of transcribing call audio based on audio quality in accordance with one or more embodiments.

Transcribing Call Audio Based on Audio Quality

Figure 3:
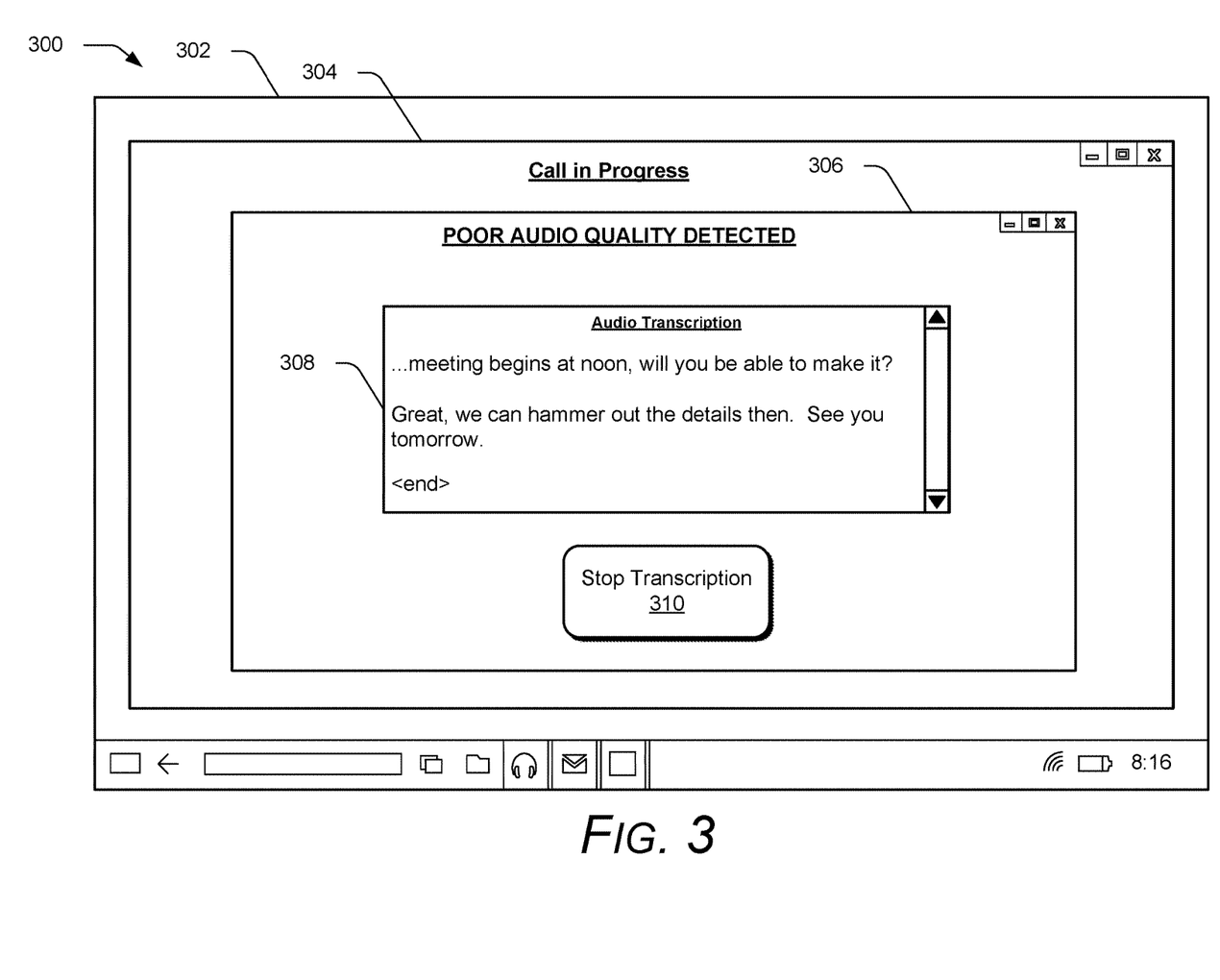
FIG. 3 illustrates an example of transcribing call audio in accordance with one or more embodiments.

FIG. 3 illustrates a computing device, generally at 300, that includes a display device 302. The computing device 300 includes an application in the form of a communication system that includes a user interface 304. In this example, an audio call is in progress between a user of the computing device implementing the communication system and at least one additional user located remotely from the computing device implementing the communication system. While the audio call is in progress, poor audio quality may be detected when environmental noise at the computing device rises to a level that overwhelms a level of the call audio being output by the computing device. Alternatively or additionally, poor audio quality may be detected when delays between sequential data packets carrying audio data increase to a point where individual data packets might be dropped before the audio data can be extracted and played back at the computing device. In these instances, the poor audio quality indicates that a user is unlikely to hear call audio played back at the computing device.

The various embodiments described herein mitigate the problems associated with poor audio quality scenarios, as well as others, by providing a communication system that determines when a user is unlikely to hear call audio and automatically transcribes call audio for display to the user. For example, the communication system is configured to cause display of a poor audio quality user interface 306 that notifies a user of the computing device implementing the communication system when call audio transcription is about to begin. Notifying a user that call audio transcription is about to begin can be performed in any suitable manner.

For example, the communication system may visually notify the user by automatically displaying the poor audio quality user interface 306, displaying a visual indicator in a taskbar of the computing device, displaying a notification, and so on. Alternatively or additionally, the communication system may audibly notify the user by playing a tone, chime, or other sound that is recognizable by the user as signifying initiation of call audio transcription. Alternatively or additionally, the communication system may physically notify the user by causing the computing device to vibrate. In this manner, even when a user is not looking at the display device 302, the communication system can alert the user to look at the display device to view a transcription of call audio that would otherwise be inaudible.

After notifying the user that call audio transcription is about to begin, the communication system displays an audio transcription user interface 308 and a selectable control 310 to stop transcription. Although not illustrated, the communication system user interface 304 may include a selectable control to initiate call audio transcription. Thus, a user of the computing device is able to initiate call audio transcription even in scenarios where the communication system determines that the user is likely able to hear received call audio. In the illustrated audio transcription user interface 308, call audio is transcribed into text and visually displayed. In this manner, a user of the computing device implementing techniques described herein is able to understand information being communicated via call audio that would be otherwise inaudible. In some embodiments, the text of the audio transcription is converted into synthesized speech and played back simultaneously with the displayed audio transcription user interface 308. As described herein, this synthetic speech playback is particularly useful in scenarios where data packet jitter and latency would otherwise result in a data packet being dropped before call audio could be extracted and played back at the computing device.

Display of the audio transcription user interface 308 is continued until the communication system determines that the user is likely able to hear received call audio. Alternatively, display of the audio transcription user interface 308 is continued until user input is received at the selectable control 310 to stop transcription. Upon receiving input instructing the call system to stop transcription or upon determining that the user is likely able to hear received call audio, the communication system removes display of the poor audio quality user interface 306 and the audio call proceeds without transcription.

Consider now examples of determining that a user is unlikely able to hear call audio received at a computing device implementing the techniques described herein.

Determining Audio Quality Based on Environmental Noise

In one or more embodiments, the communication system described herein determines that a user is unlikely able to hear received call audio based on environmental noise received by a microphone of a computing device implementing the communication system. For example, when a user of the computing device participates in an audio call, the communication system constantly monitors environmental noise generated from sources other than the user of the computing device.

The communication system may distinguish the user's speech from other noise using a variety of techniques. For example, the communication system can be trained to recognize sound waves generated by the user's vocal cords over the course of multiple voice calls and identify patterns that can be distinguished from sounds generated from different sources. Additionally or alternatively, the communication system can be user-independent and configured to differentiate human speech from other sound sources using Hidden Markov Models, neural networks, and the like. The communication system determines a level of the environmental noise and quantifies this level in terms of decibels.

The communication system is configured to constantly compare the determined environmental noise levels against audio parameters that specify a threshold level of environmental noise. This threshold level of environmental noise can similarly be quantified in terms of decibels. As such, the communication system is made aware of a threshold level that, when satisfied, indicates that the environmental noise is likely loud enough to inhibit a user's ability to clearly hear call audio.

In some embodiments, the threshold level of environmental noise is specified by a manufacturer of the computing device implementing the communication system. Alternatively or additionally, the threshold level of environmental noise is specified by the user of the computing device implementing the communication system. In some embodiments, the communication system may periodically prompt the user for feedback regarding whether the user is able to hear the call audio. In this manner, the communication system can record user feedback and adjust the threshold level of environmental noise to account for different user preferences.

The threshold level of environmental noise can also be specified as a function of a level of call audio received at the computing device. For example, the threshold level of environmental noise can be satisfied when a level of the received call audio is equivalent to a level of the environmental noise. Alternatively or additionally, the threshold level of environmental noise can be satisfied when the level of environmental noise is within a specified decibel range from the level of received call audio. Thus, the communication system is configured to constantly monitor environmental noise and determine when the environmental noise reaches a level that makes it unlikely for a user to hear received call audio.

After determining that the environmental noise satisfies an environmental noise threshold, the communication system begins transcribing received audio data to text and displaying the transcribed text, using the techniques described herein. The communication system continues to transcribe received audio data until it determines that the monitored environmental noise no longer satisfies the threshold level of environmental noise. Having considered how audio quality can be determined based on environmental noise, consider now examples of determining audio quality based on data packet latency.

Determining Audio Quality Based on Data Packet Latency

In one or more embodiments, the communication system described herein determines that a user is unlikely able to hear received call audio received in a series of data packets based on latency between sequential data packets, e.g., two sequential data packets in the series of data packets. For example, calls that transmits media data (e.g., audio, video, and the like) using data packets, such as an IP Multimedia Subsystem (IMS) call that transmits media data using Real-time Transport Protocol (RTP) packets, scenarios arise where RTP packets are dropped before call audio can be extracted and played back to a user. Although described with respect to an IMS call, the techniques described herein can be implemented by any type of module or system responsible for the handling of RTP packets. Due to network traffic or errors, data packets are often lost during transfer between two endpoints. One approach to anticipate when a data packet might be lost is to monitor the time delay, also described in terms of latency or jitter, between sequentially received data packets. A greater latency between sequential data packets indicates that the network is overloaded and is likely to drop a subsequent data packet. Alternatively or additionally, a greater latency between sequential data packets may indicate that the device receiving data packets is dropping data packets with high jitter after reception.

Upon receiving data packets, the communication system is configured to decode the data packets and extract audio data from the data packets. The IMS monitors latencies between received data packets and allow the communication system to decode data packets only when the latencies between received data packets do not amount to excessive delay. However, when latencies between received data packets amount to excessive delay, the IMS drops the packets before audio data can be extracted from the dropped packets. Accordingly, using the techniques described herein, the communication system monitors latencies between received data packets to predict when a data packet might be dropped. Using the techniques described herein, the communication system has access to an incoming RTP stream received at the IMS of the computing device implementing the communication system. This enables the communication system to keep track of inter-packet delays, e.g., latencies between sequential data packets.

In some embodiments, the communication system compares the monitored latencies between received data packets to a threshold level of data packet latency. This threshold level of data packet latency is quantified in terms of time. As such, the communication system is made aware of a threshold level that, when satisfied, indicates that a data packet will be dropped rather than decoded for playback of contained audio data. In some embodiments, the threshold level of data packet latency is specified by a manufacturer of the computing device implementing the communication system. Alternatively or additionally, the threshold level of data packet latency is specified by the user of the computing device implementing the communication system. Alternatively or additionally, the threshold level of data packet latency is specified by a service provider facilitating transfer of data packets between the computing device implementing the communication system and different devices participating in the audio call. In some examples, the threshold level of data packet latency is representative of a latency level at which data packets are dropped by the IMS to avoid large end-to-end audio delays.

After determining that the monitored latency between received data packets satisfies the threshold level of data packet latency, the communication system retrieves data packets from the IMS before they are de-queued and discarded. After retrieving the data packets, the communication system extracts audio data from the data packets and transcribes speech from the audio data for visual display at the computing device implementing the communication system. In some embodiments, the communication system generates synthesized speech from the transcribed audio data and interjects the synthesized speech into playback of the audio data to fill in audio gaps that would otherwise result from dropped data packets. This enables the communication system to simultaneously display transcribed audio data while playing back a stream of received audio data that includes a portion of synthesized speech from otherwise dropped data packets.

Thus, after determining that data packet latency satisfies a data packet latency threshold, the communication system transcribes call audio retrieved from data packets that otherwise would have been dropped, and visually displays text of the transcribed call audio at a display device. The communication system additionally or alternatively generates synthesized speech from the transcribed call audio and interjects the synthesized speech into playback of audio data from data packets that were not dropped by the IMS to fill in audio gaps for the call. The communication system continues to transcribe call audio from data packets that would have otherwise been dropped until it determines that the monitored data packet latency no longer satisfies the threshold level of data packet latency. Accordingly, the techniques described herein enable a user to obtain information communicated in an audio call when the information would have otherwise been inaudible.

Having considered various embodiments in which call audio is transcribed based on audio quality, consider now an example method in accordance with one or more embodiments.

Figure 4:
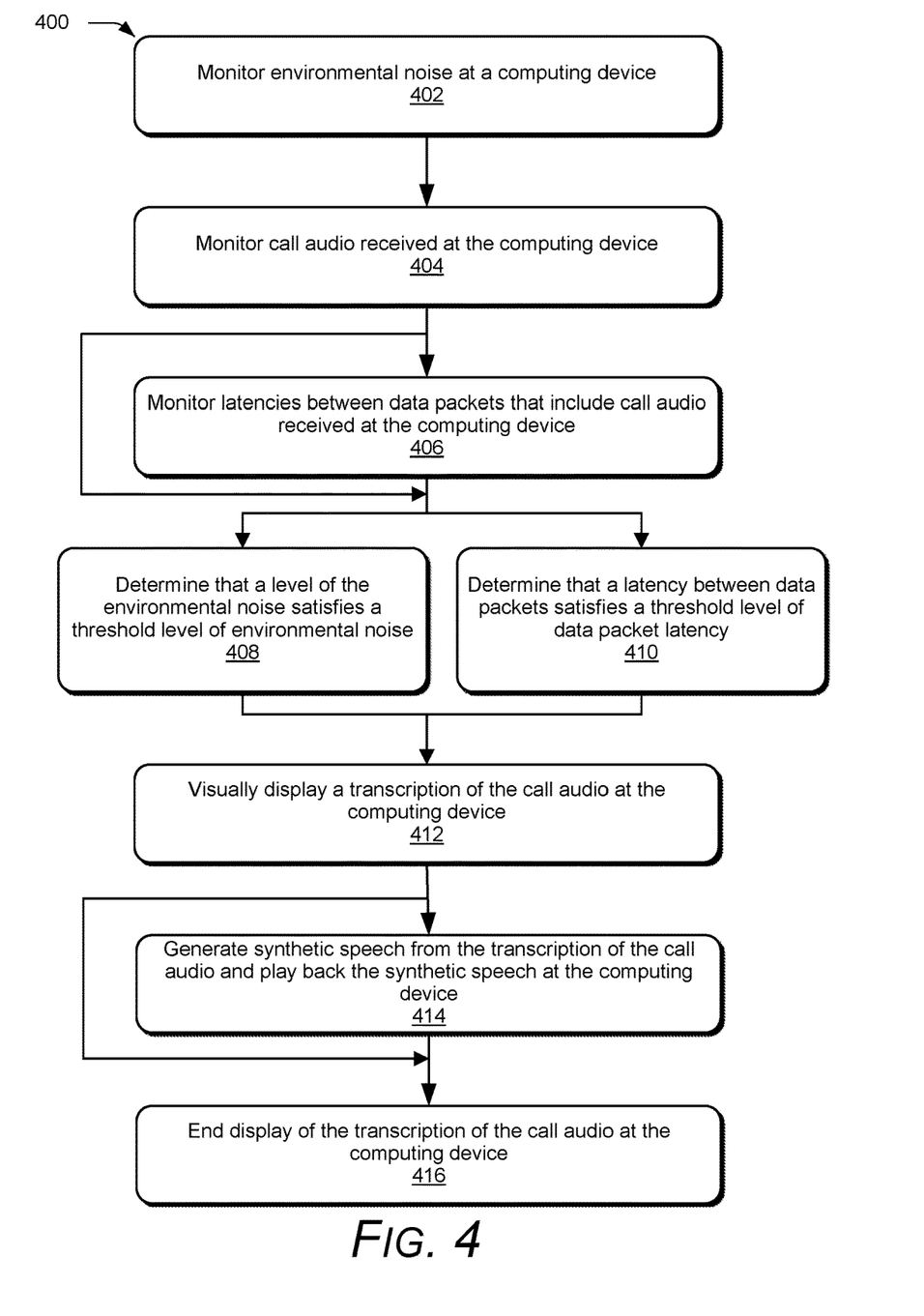
FIG. 4 illustrates a flow diagram in which transcribing call audio based on audio quality is employed in accordance with one or more embodiments.

FIG. 4 illustrates an example method 400 of transcribing call audio based on audio quality in accordance with one or more embodiments. The method can be performed by any suitable hardware, software, firmware, or combination thereof. In at least some embodiments, aspects of the method can be implemented by one or more suitably configured hardware components and/or software modules, such one or more components included in communication system 106 of FIG. 1.

Step 402 monitors environmental noise at a computing device. This operation can be performed in any suitable manner. For example, a device implementing the communication system 106 can use a microphone, such as microphone 112, to detect environmental noise, such as noise generated by environment 104 of FIG. 1. In accordance with some embodiments, monitoring environmental noise includes determining a level of environmental noise that is quantified in terms of decibels.

Step 404 monitors call audio received at the computing device. This operation can be performed in any suitable manner. For example, a device implementing the communication system 106 can receive call audio from at least one remote device, such as one or more of client devices 116 via a network 118 as illustrated in FIG. 1. In accordance with some embodiments, monitoring call audio received at the computing device includes determining a level of the received call audio that is quantified in terms of decibels.

In some embodiments, the computing device monitors latencies between data packets that include call audio received at the computing device at step 406. Monitoring latencies between data packets that include call audio is optional, as illustrated by the arrow circumventing step 406. For example, monitoring latencies between data packets that include call audio may be performed when call audio is received via an IP Multimedia Subsystem (IMS) call. In addition to IMS calls, monitoring latencies between data packets that include call audio may be performed in any type of audio call that transmits call audio in a sequence of packets. In some embodiments, monitoring latencies between data packets includes determining an elapsed time between receiving two sequential call audio data packets.

During the audio call, the computing device determines that a user is unlikely to hear received call audio when a level of the environmental noise satisfies a threshold level of environmental noise at step 408. For example, a current level of environmental noise determined in step 402 can be contrasted against information specifying a threshold level of environmental noise, such as information included in audio parameter table 110 of FIG. 1. In some embodiments, the threshold level of environmental noise is specified by a manufacturer of the computing device implementing the communication system 106, and is "hard-wired" into the computing device. Alternatively or additionally, the threshold level of environmental noise is specified by a user or learned from user interactions with the computing device implementing communication system 106. In some embodiments, the threshold level of environmental noise changes as a function of a level of the call audio received at the computing device.

Alternatively or additionally, the computing device determines that a user is unlikely to hear received call audio when a latency between two sequential data packets satisfies a threshold level of data packet latency. For example, a latency between sequential data packets determined in step 406 can be contrasted against information specifying a threshold level of data packet latency, such as information included in the audio parameter table 110 of FIG. 1. In some embodiments, the threshold level of data packet latency is specified by a manufacturer of the computing device implementing the communication system 106. Alternatively or additionally, the threshold level of data packet latency is specified by a user of the computing device implementing communication system 106. Alternatively or additionally, the threshold level of data packet latency is specified by a service provider facilitating transfer of call audio between the computing device implementing communication system 106 and at least one different device, such as client devices 116 of FIG. 1.

In response to determining that a user is unlikely to hear received call audio via at least one of steps 408 or 410, the computing device visually displays a transcription of the call audio at step 412. Transcription of the call audio may be performed using any suitable technique for extracting speech characteristics from audio and translating the speech characteristics into text. In some embodiments, the computing device additionally generates a notification to inform a user of the computing device that a display of transcribed audio is about to begin. For example, the notification may include at least one of a visual notification, an audible notification, or a physical notification.

In some embodiments, the computing device generates synthetic speech from the transcription of the call audio and plays back the synthetic speech at the computing device at step 414. Generating and playing back synthetic speech is optional, as illustrated by the arrow circumventing step 414. Alternatively or additionally, the computing device may generate synthetic speech from the transcribed text and play back the synthetic speech simultaneously with the display of transcribed call audio. In this manner, the computing device implementing communication system 106 provides both visual and audible information describing received call audio that would otherwise be inaudible.

At step 416, the computing device ends display of the transcription of the call audio. The computing device may end display of the transcription in response to determining that a user is likely able to hear call audio received at the computing device. For example, the computing device implementing communication system 106 may determine that a user is likely able to hear call audio when environmental noise no longer satisfies the threshold level of environmental noise. Alternatively or additionally, the computing device implementing communication system 106 may determine that a user is likely able to hear call audio when a latency between sequential data packets including call audio no longer satisfies the threshold level of data packet latency. Alternatively or additionally, the computing device implementing communication system 106 may determine that a user is likely able to hear call audio in response to receiving user input indicating that the user is able to hear the call audio.

The various embodiments described herein improve upon the state of the art by monitoring call audio and environmental noise, and automatically transcribing call audio upon determining that the call audio would otherwise be inaudible to a user. This relieves users of having to ask a speaking party on a call to repeat previously communicated information or waiting to communicate with the speaking party at a later time. In this manner, user experience with voice and video calls is improved because the user can communicate in loud and noisy environments that would otherwise prohibit such communications. As such, the possibility of missing information communicated in a call is significantly reduced.

Having considered a discussion of transcribing call audio based on audio quality, consider now a discussion of an example device which can include call audio transcription techniques based on audio quality in accordance with various embodiments described herein.

Example Device

Figure 5:
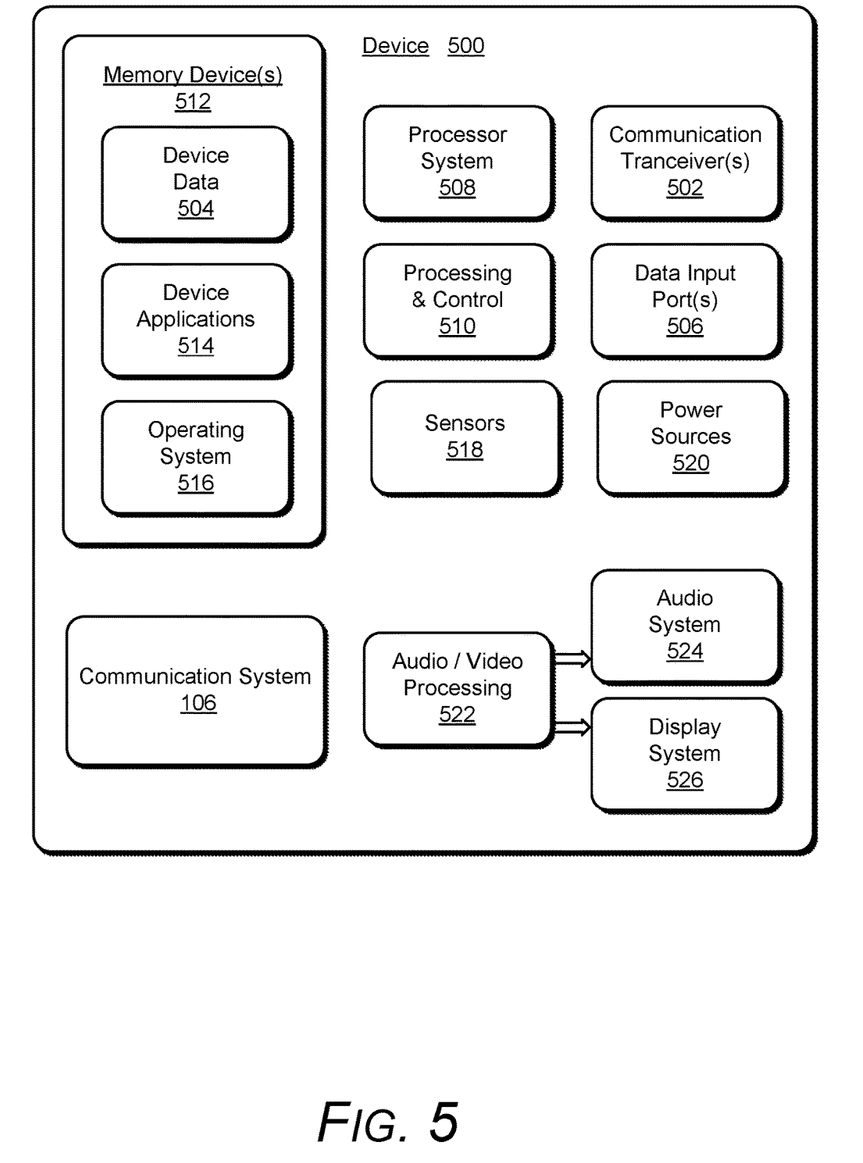
FIG. 5 is an illustration of an example device in accordance with one or more embodiments.

FIG. 5 illustrates various components of an example device 400 in which embodiments of transcribing call audio based on audio quality can be implemented. The example device 500 can be implemented as any of the devices described with reference to the previous figures, such as any type of client device, mobile phone, tablet, computing, communication, entertainment, gaming, media playback, and/or other type of electronic device.

The device 500 includes communication transceivers 502 that enable wired and/or wireless communication of device data 504 with other devices. The device data 504 can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system 508 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware.

Alternately or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory devices 512 that enable data storage, such as data storage devices that can be accessed by a computing device, and that provide persistent storage of data and executable instructions (e.g., software applications, programs, functions, and the like). Examples of the computer-readable storage memory devices 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory device 512 provides data storage mechanisms to store the device data 504, other types of information and/or data, and various device applications 514 (e.g., software applications). For example, an operating system 516 can be maintained as software instructions with a memory device and executed by the processing system 508. Additionally, although illustrated separate from the computer-readable storage memory device 512, the communication system 106 can be maintained as one of device applications 514. The device applications may also include a device manager, such as any form of a control application, software application, signal-processing and control module, code that is native to a particular device, a hardware abstraction layer for a particular device, and so on.

Device 500 can include communication system 106, which operates as described herein. The communication system 106 can be implemented in any suitable hardware, software, firmware, or combination thereof.

The device 500 can also include one or more device sensors 518, such as any one or more of an ambient light sensor, a proximity sensor, a touch sensor, an infrared (IR) sensor, accelerometer, gyroscope, and the like. The device 500 can also include one or more power sources 520, such as when the device is implemented as a mobile device. The power sources may include a charging and/or power system, and can be implemented as a flexible strip battery, a rechargeable battery, a charged super-capacitor, and/or any other type of active or passive power source.

The device 500 additionally includes an audio and/or video processing system 522 that generates audio data for an audio system 524 and/or generates display data for a display system 526. In accordance with some embodiments, the audio/video processing system 522 is configured to receive call audio data from the communication system 106 and communicate the call audio data to the audio system 524 for playback at the device 500. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link. In implementations, the audio system and/or the display system are integrated components of the example device. Alternatively, the audio system and/or the display system are external, peripheral components to the example device.

Although the embodiments described above have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

The invention claimed is:

1. A computing device comprising:
one or more processors; and
one or more computer readable storage media storing computer-readable instructions which, when executed, perform operations comprising:
monitoring, using a communication system, environmental noise at the computing device;
monitoring, using the communication system, call audio received as a series of data packets at the computing device;
determining, using the communication system, that a level of the environmental noise satisfies an environmental noise level threshold;
visually displaying a transcription of at least a portion of the received call audio in response to determining that the level of the environmental noise satisfies the environmental noise level threshold;
continuing to display the transcription of at least the portion of the received call audio until determining that the level of the environmental noise no longer satisfies the environmental noise level threshold;
determining that a latency between two sequential data packets in the series of data packets satisfies a threshold level of data packet latency;
generating synthesized speech of call audio included in the two sequential data packets in response to determining that the latency between the two sequential data packets satisfies the threshold level of data packet latency; and
continuing to generate synthesized speech of call audio included in data packets received subsequent to the two sequential data packets until determining that a latency between subsequent data packets no longer satisfies the threshold level of data packet latency.

2. The computing device as recited in claim 1, wherein determining that the level of the environmental noise no longer satisfies the environmental noise level threshold is performed in response to receiving user input at the computing device indicating that a user of the computing device can hear the call audio from the computing device.

3. The computing device as recited in claim 1, wherein visually displaying the transcription of at least the portion of the received call audio is performed in real-time as the call audio is received at the computing device.

4. The computing device as recited in claim 1, wherein the environmental noise level threshold is dependent on a decibel level of the call audio received at the computing device.

5. The computing device as recited in claim 1, wherein visually displaying the transcription and generating the synthesized speech are performed simultaneously.

6. The computing device as recited in claim 1, wherein monitoring the environmental noise is performed by monitoring background noise using a microphone of the computing device, the background noise being different from speech of a user of the computing device.

7. The computing device as recited in claim 1, wherein the environmental noise level threshold is specified by a manufacturer of the computing device or a user of the computing device.

8. A method, comprising:
monitoring, using a communication system, environmental noise at a computing device;
monitoring, using the communication system, call audio received as a series of data packets at the computing device;
determining, using the communication system, that a level of the environmental noise satisfies an environmental noise level threshold;
responsive to determining that the level of the environmental noise satisfies the environmental noise level threshold, visually displaying a transcription of at least a portion of the received call audio;
continuing to display the transcription of at least the portion of the received call audio until determining that the level of the environmental noise no longer satisfies the environmental noise level threshold;
determining that a latency between two sequential data packets in the series of data packets satisfies a threshold level of data packet latency;
responsive to determining that the latency between the two sequential data packets satisfies the threshold level of data packet latency, generating synthesized speech of call audio included in the two sequential data packets; and
continuing to generate synthesized speech of call audio included in data packets received subsequent to the two sequential data packets until determining that a latency between subsequent data packets no longer satisfies the threshold level of data packet latency.

9. The method as recited in claim 8, wherein determining that the level of the environmental noise no longer satisfies the environmental noise level threshold is performed in response to receiving user input at the computing device indicating that a user of the computing device can hear the call audio from the computing device.

10. The method as recited in claim 8, wherein visually displaying the transcription of at least the portion of the received call audio is performed in real-time as the call audio is received at the computing device.

11. The method as recited in claim 8, wherein the environmental noise level threshold is dependent on a decibel level of the call audio received at the computing device.

12. The method as recited in claim 8, wherein visually displaying the transcription and generating the synthesized speech are performed simultaneously.

13. The method as recited in claim 8, wherein monitoring the environmental noise is performed by monitoring background noise using a microphone of the computing device, the background noise being different from speech of a user of the computing device.

14. The method as recited in claim 8, wherein the environmental noise level threshold is specified by a manufacturer of the computing device or a user of the computing device.

15. One or more computer readable storage media storing computer-readable instructions which, when executed, perform operations comprising:
monitoring environmental noise at a computing device;
monitoring call audio received as a series of data packets at the computing device;
determining that a level of the environmental noise satisfies an environmental noise level threshold;
responsive to determining that the level of the environmental noise satisfies the environmental noise level threshold, visually displaying a transcription of at least a portion of the received call audio;
continuing to display the transcription of at least the portion of the received call audio until determining that the level of the environmental noise no longer satisfies the environmental noise level threshold;
determining that a latency between two sequential data packets in the series of data packets satisfies a threshold level of data packet latency;
responsive to determining that the latency between the two sequential data packets satisfies the threshold level of data packet latency, generating synthesized speech of call audio included in the two sequential data packets; and
continuing to generate synthesized speech of call audio included in data packets received subsequent to the two sequential data packets until determining that a latency between subsequent data packets no longer satisfies the threshold level of data packet latency.

16. The one or more computer readable media as recited in claim 15, wherein determining that the level of the environmental noise no longer satisfies the environmental noise level threshold is performed in response to receiving user input at the computing device indicating that a user of the computing device can hear the call audio from the computing device.

17. The one or more computer readable media as recited in claim 15, wherein visually displaying the transcription of at least the portion of the received call audio is performed in real-time as the call audio is received at the computing device.

18. The one or more computer readable media as recited in claim 15, wherein the environmental noise level threshold is dependent on a decibel level of the call audio received at the computing device.

19. The one or more computer readable media as recited in claim 15, wherein visually displaying the transcription and generating the synthesized speech are performed simultaneously.

20. The one or more computer readable media as recited in claim 15, wherein the environmental noise level threshold is specified by a manufacturer of the computing device or a user of the computing device.

* * * * *